United States Patent [19]

Matsuura et al.

[11] Patent Number: 4,575,665
[45] Date of Patent: Mar. 11, 1986

[54] TRACER CONTROL METHOD

[75] Inventors: Hitoshi Matsuura; Etsuo Yamazaki; Hiroshi Sakurai, all of Tokyo, Japan

[73] Assignee: Fanuc Limited, Minamitsuru, Japan

[21] Appl. No.: 641,944

[22] PCT Filed: Dec. 21, 1983

[86] PCT No.: PCT/JP83/00447
§ 371 Date: Aug. 10, 1984
§ 102(e) Date: Aug. 10, 1984

[87] PCT Pub. No.: WO84/02487
PCT Pub. Date: Jul. 5, 1984

[30] Foreign Application Priority Data

Dec. 22, 1982 [JP] Japan .............................. 57/233385

[51] Int. Cl.$^4$ .............................................. G05B 19/33
[52] U.S. Cl. .................................... 318/578; 318/565; 318/568
[58] Field of Search .................... 318/578, 565, 568

[56] References Cited

U.S. PATENT DOCUMENTS 3,611,874 2/1970 Larsen et al. .................. 318/578 X
4,489,377 12/1984 Mawyer et al. ............... 318/565 X Primary Examiner—William M. Shoop, Jr.
Assistant Examiner—Saul M. Bergmann
Attorney, Agent, or Firm—Staas & Halsey

[57] ABSTRACT

A tracer control method whereby a tracer machining inhibit area is set and tracer machining is performed while skipping the machining inhibit area, the method including presetting a tracer machining inhibit area (TMI) and a safe level ($ZL_s$) after taking into account the shape of a model (MDL). The method also includes moving a tracer head along the surface of the model to perform tracer machining in an area (TM), inhibiting tracer machining when the tracer head reaches the machining inhibit area (TMI), and raising the tracer head to the safe level ($ZL_s$). After reaching the safe level the method includes moving the tracer head along the safe level to a boundary of the machining inhibit area after the tracer head reaches the safe level, thereafter performing an approach operation, and resuming tracer machining in an area (TM') after the approach is completed.

10 Claims, 4 Drawing Figures

TRACER CONTROL METHOD

DESCRIPTION

BACKGROUND OF INVENTION

The present invention relates to a tracer control method and, more particularly, to a tracer control method whereby a tracer machining inhibit area is set and tracer machining is performed while skipping the inhibit area.

A tracer appartus operates by calculating velocity commands along various axes by means of a tracer arithmetic circuit using a deflection value sensed by a tracer head, driving motors for the corresponding axes on the basis of the velocity commands along these axes to transport a tool relative to a workpiece, and repeating these operations to machine the workpiece into a shape identical to that of the model. In tracer control of this kind, the tracer head generally is made to trace the entire surface of the model to provide a machined object having a shape which is exactly the same as that of the model. There is now a requirement for tracer machining control whereby a portion of the model is skipped and both sides (or only one side) with respect to the skipped portion are traced. Such tracer machining control is well-suited for application to the machining of, say, a propeller having a boss and blades formed around the boss. The reason is that cutting solely the complicatedly shaped blade portions of a propeller under tracer control and applying NC control to cut the boss portion, which is difficult to trace because of its steep gradient, makes it possible to shorten machining time and improve the precision to which the boss portion is machined in comparison with tracer machining being applied to the entirety of the propeller.

In the prior art, if the portion desired to be skipped has, say, a concave configuration, the concave portion is flattened by being filled with clay or the like, the entire surface of the flattened model is traced to provide a machined object, and a concavity is subsequently formed in a predetermined portion of the machined object by NC control to provide the final article. With this method, however, fabricating the model is a troublesome operation. Moreover, since the skipped portion is machined to a flat shape by tracer control and is then machined into a concavity by NC control, forming the concave portion requires two operations, thereby lengthening machining time.

SUMMARY OF THE INVENTION

Accordingly, an object of the present invention is to provide a tracer control method in which a model need not be remade, and in which the time required to obtain a final article can be shortened.

Another object of the present invention is to provide a tracer control method whereby a portion of a model, e.g., a portion which is difficult to trace, is skipped automatically, with tracer machining being applied to both sides, or to only one side, with respect to this portion.

The present invention provides a tracer control method which includes presetting a tracer machining inhibit area (skip area) and a safe level, monitoring a machine position at all times during tracer machining, inhibiting tracer machining when the machine position reaches the skip area and retracting the machine until the machine position coincides with the safe level, then transporting the machine in such a manner that the machine position moves along the safe level and passes the skip area, and resuming tracer machining after the skip area is passed.

DESCRIPTION OF THE PREFERRED EMBODIMENTS

Figure 1A:
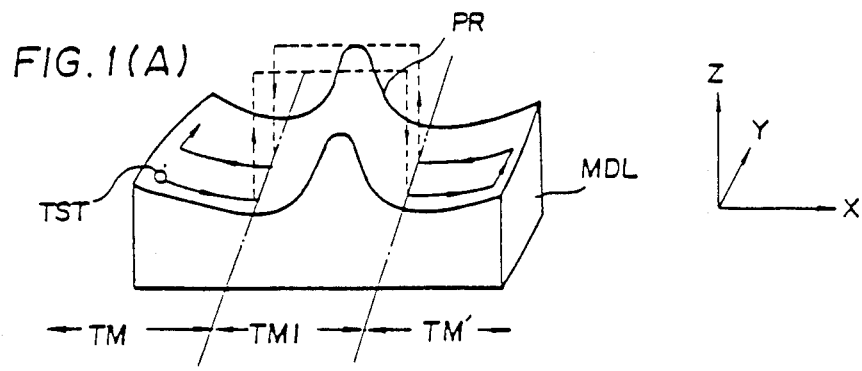
FIG. 1, including 1(A) and 1(B), is a simplified view for describing the present invention.
Figure 1B:
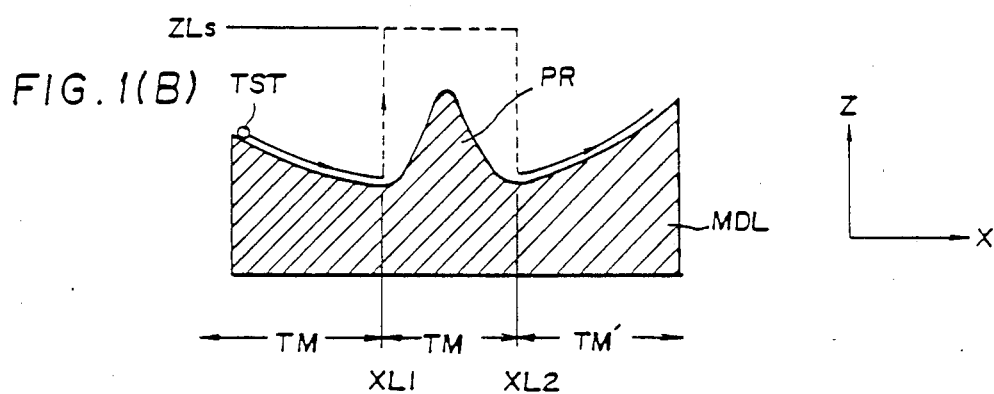

FIG. 1 is a simplified view for describing the present invention, in which (A) is a perspective view and (B) a sectional view. Formed at substantially the center of a model MDL is a projection PR. An area TMI containing the projection is a tracer machining inhibit area (skip area) in which tracer machining is unnecessary. Two areas TM, TM' on either side of the area TMI are tracer machining areas. To trace the model by two-way scan tracing, the present invention performs tracing by specifying the machining inhibit area TMI beforehand, i.e., presetting boundary values $XL_1$, $XL_2$ in the feed direction (along the X axis is the illustration of FIG. 1), as well as a Z-axis coordinate $ZL_s$ indicative of a safe level in the tracing direction (the Z axis is illustrated in FIG. 1), executing tracing from an approach end point TST in the direction of the solid arrow line shown in FIG. 1, monitoring the machine position at all times, suspending tracer feed control when the machine position reaches the tracer machining inhibit area, namely when the present position of the machine along the X axis becomes equivalent to $XL_1$, thereafter transporting the machine along the dashed arrow line until the machine position reaches the safe level, namely until the present position of the machine along the Z axis coincides with $ZL_s$, then moving the machine along the safe level until the present position of the machine along the X axis coincides with $XL_2$ (i.e., until the inhibit area is passed), causing the machine to approach the workpiece after the inhibit area has been passed, executing tracer machining again after the approach, and thenceforth repeating the foregoing opeations.

Figure 2:
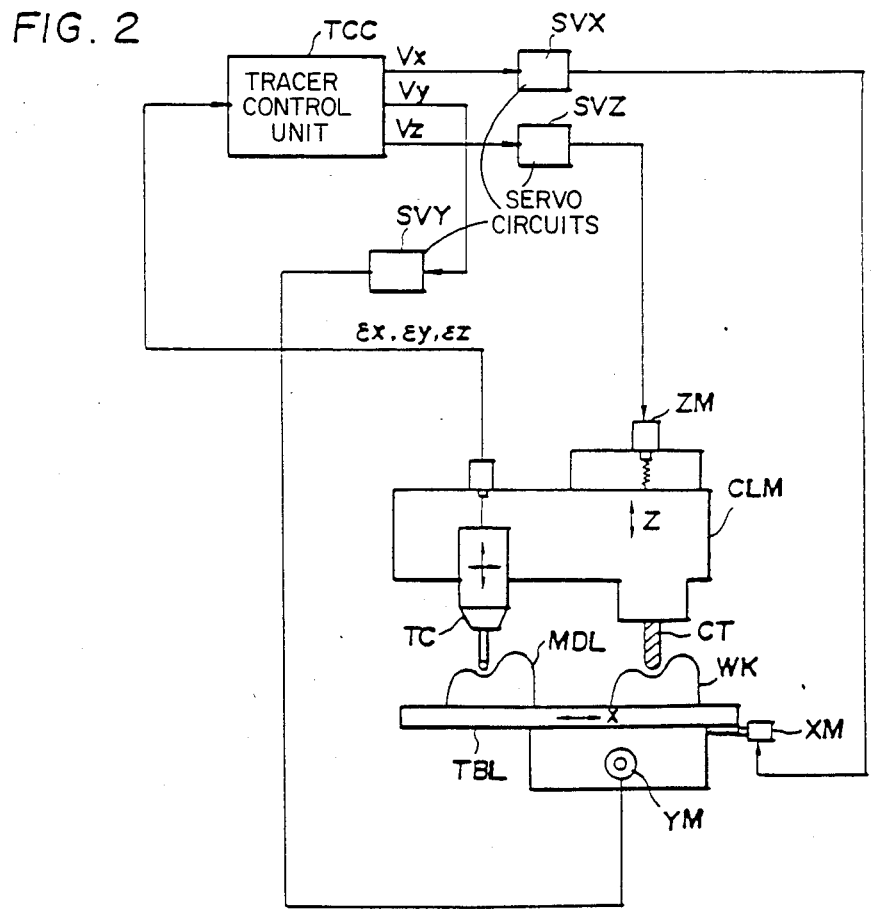
FIG. 2 is a simplified view of a tracing machine tool to which the present invention can be applied.

FIG. 2 is a simplified view of a machine tool to which the present invention can be applied. The tracing machine tool is provided with an X-axis motor XM for driving a table TBL along the X axis, a Z-axis motor ZM for driving, along the Z axis, a column CLM mounting a tracer head TC and a cutter head CT, and a Y-axis motor YM for moving the table TBL along the Y axis. Secured to the table TBL are a model MDL and a workpiece WK. The tracer head TC contacts and traces the surface of the model MDL, and the cutter head CT cuts the workpiece WK in accordance with the shape of the model. As is known in the art, the tracer head TC is arranged to sense deflection $\epsilon_x$, $\epsilon_y$, $\epsilon_z$ along the respective X, Y and Z axes of the surface of model MDL, and the deflection $\epsilon_x$, $\epsilon_y$, $\epsilon_z$ along the various axes sensed by the tracer head TC is applied to a tracer control unit TCC, which performs known tracing calculations to generate velocity components along respective axes. For example, as a tracing method, let us consider two-way scan tracing on the X-Z plane. This is performed by generating velocity components $V_x$, $V_z$, and applying these to X- and Z-axis motors XM, ZM via servo circuits SVX, SVZ, respectively, whereby the motors XM, ZM are driven into rotation. As a result, the cutter head CT is transported relative to the workpiece WK to cut the workpiece to the shape of the model MDL, and the tracer head TC traces the surface of the model. It should be noted that SVY denotes a servo circuit for driving a motor YM in order to perform a pick-feed along the Y axis.

Figure 3:
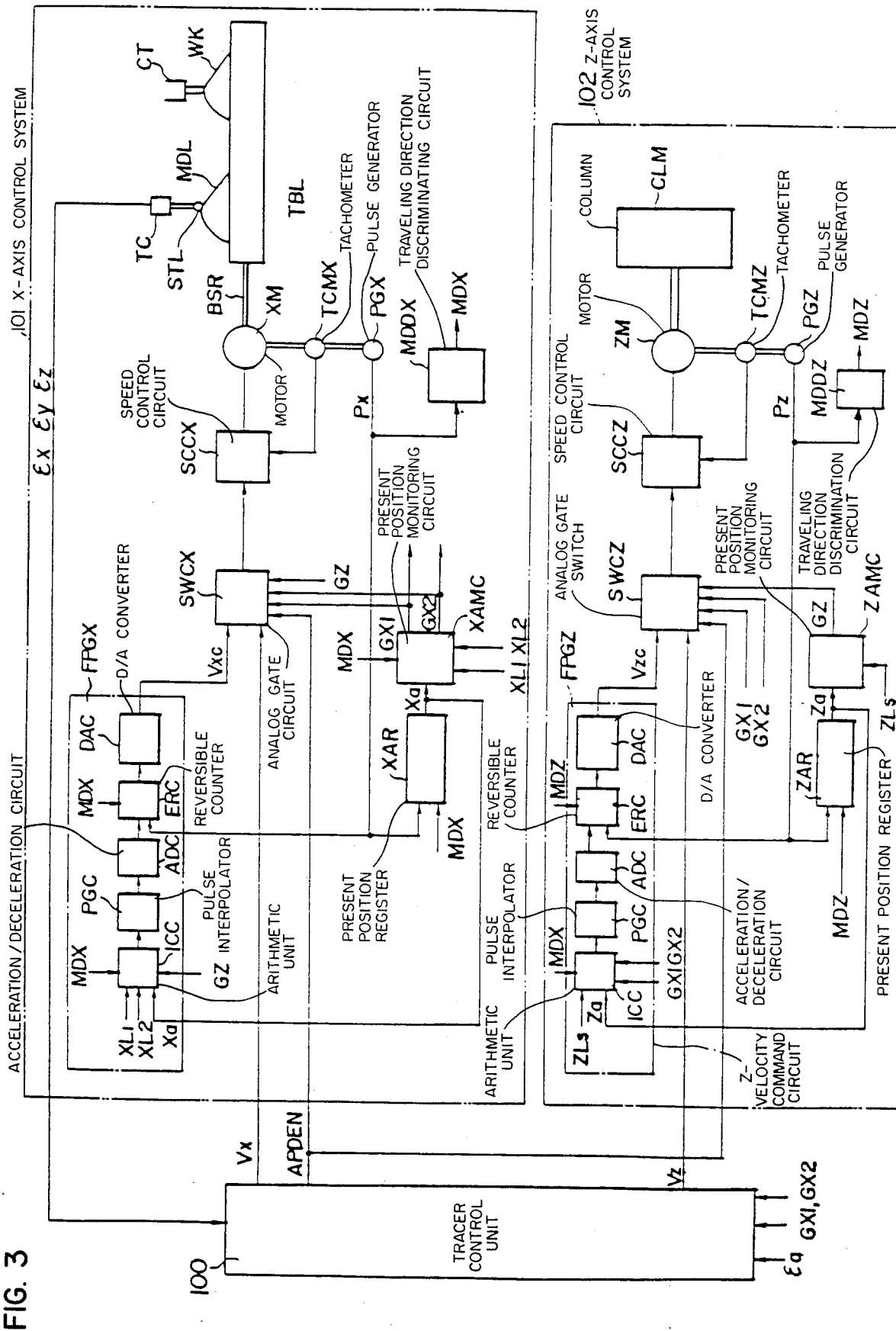
FIG. 3 is a block diagram illustrating an embodiment of the present invention.

FIG. 3 is a block diagram of the present invention for practicing the two-way scan tracing shown in FIG. 1. Numeral 100 denotes a known tracer control unit, 101 an X-axis control system, and 102 a Z-axis control system. The tracer control unit 100 generates feed velocities $V_x$, $V_z$ along the respective axes (X and Z axes) on the basis of axial deflection signals $\epsilon_x$, $\epsilon_y$, $\epsilon_z$ produced by a stylus, and produces an approach end signal APDEN when the resultant deflection $\epsilon(=\sqrt{\epsilon_x^2+\epsilon_y^2+\epsilon_y^2})$ surpasses a predetermined value $\epsilon_a$. The X-axis control system 101 includes the model MDL, the workpiece WK, the cutter head CT, the tracer head TC, a stylus STL in contact with the surface of the model, a speed control circuit SCCX, the motor XM for driving the table TBL along the X axis, which table has the model MDL and workpiece WK mounted thereon, a tachometer TCMX for sensing the velocity of the motor XM, a pulse generator PGX for generating a single feedback pulse $P_x$ whenever the motor XM rotates by a predetermined amount, a ball screw BSR driven by the motor XM, and an X-axis velocity command circuit FPGX for transporting the table TBL along the X-axis at the safe level $ZL_s$ and at a predetermined velocity when the present position $Z_a$ of the machine along the Z axis reaches the safe level. The circuit FPGX includes an arithmetic unit ICC for calculating the difference (an incremental value) $\Delta X$ between the present position $X_a$ along the X axis and boundary value $XL_2$ or boundary value $XL_1$, depending upon the direction of travel (i.e., depending upon the "1", "0" logic of a signal MDX indicative of traveling direction, described below), a pulse interpolator PGC, an acceleration/deceleration circuit ADC for accelerating or decelerating interpolated pulses, a reversible countr ERC for counting up or counting down output pulses from the acceleration/deceleration circuit ADC depending upon traveling direction (where travel is in the positive direction when the traveling direction signal MDX is logical "1" and in the negative direction when the signal MDX is logical "0"), and for counting up or counting down, depending upon traveling direction, the feedback pulses $P_x$ generated by the pulse generator PGX, thereby to count the difference between the number of interpolated pulses and the number of feedback pulses, and a DA converter DAC for producing an analog voltage output which is proportional to the value of the count recorded by the reversible counter ERC. SWCX designates an analog gate circuit for providing the speed control circuit SCCX with the velocity command $V_x$ produced by the tracer control unit 100, or with an X-axis velocity command $V_{xc}$ produced by the X-axis velocity command circuit FPGX, depending upon the present position of the machine. XAR denotes an X-axis present position register for recording the present position $X_a$ of the machine along the X axis. The register XAR monitors the present position Xa of the machine along the X axis by counting up or counting down, depending upon the direction of travel, the feedback pulses $P_x$ generated by the pulse generator PGX. The pulse generator PGX actually generated pulses in two phases, which are displaced from each other by 90°, whenever the motor XM rotates by a predetermined amount. These pulses are applied to a traveling direction discriminating circuit MDDX which produces the traveling direction signal MDX after discriminating the traveling direction based on which of the two pulse trains leads the other in phase. XAMC represents an X-axis present position monitoring circuit for monitoring the present position $X_a$ of the machine along the X axis. Where the traveling direction is positive (MDX="1"), the monitoring circuit XAMC produces a control signal $GX_1$ when $X_a=XL_1$ is true and a control signal $GX_2$ when $X_a=XL_2$ is true. Where the traveling direction is negative (MDX="0"), the monitoring circuit XAMC produces the control signal $GX_1$ when $X_a=XL_2$ is true and the control signal $GX_2$ when $X_a=XL_1$ is true. The Z-axis control system 102 includes the column CLM driven along the Z axis by the Z-axis motor ZM and having the tracer head TC and cutter head CT mounted integrally thereon, a speed control circuit SCCZ, a tachometer TCMZ, a pulse generator PGZ for generating a single feedback pulse $P_z$ whenever the motor ZM rotates by a predetermined amount, and a Z-axis velocity command circuit FPGZ for transporting the column CLM to the safe level (i.e., until $Z_a=ZL_s$ is established) at a velocity $V_{zc}$ when the present position $X_a$ of the machine along the X axis coincides with $XL_1$, where tracing is in the positive direction. The Z-axis velocity command circuit PFGZ has the same construction as the X-axis command circuit FPGX. SWCZ designates an analog gate circuit for providing the speed control circuit SCCZ with the velocity command $V_z$ produced by the tracer control unit 100, or with an Z-axis velocity command $V_{zc}$ produced by the Z-axis velocity command circuit FPGZ, depending upon the present position of the machine. ZAR denotes a Z-axis present position register for recording the present position $Z_a$ of the machine along the Z axis. The register ZAR monitors the present position Za of the machine along the Z axis by counting up or counting down, depending upon the direction of travel along the Z axis (i.e., depending upon the "1", "0" logic of a traveling direction signal MDZ produced by a traveling direction discriminating circuit MDDZ), the feedback pulses $P_z$ generated by the pulse generator PGZ. ZAMC represents a Z-axis present position monitoring circuit for monitoring the present position $Z_a$ along the X axis and for producing a control signal GZ when $Z_a=ZL_s$ holds.

The operation of the present invention will now be described. When the approach is completed to position the stylus STL at a first point TST (the approach end point in FIG. 1), the tracer control unit 100 performs known tracer processing in accordance with the stylus deflections $\epsilon_x$, $\epsilon_y$, $\epsilon_z$ to calculate and deliver the feed velocities $V_x$, $V_z$ along the X and Z axes, respectively. $V_x$ and $V_z$ enter the speed control circuit SCCX, SCCZ through the analog gate circuits SWCX, SWCZ, so that the table TBL and column CLM are driven by the X- and Z-axis motors XM, ZM, respectively. As a result, the tracer head TC is moved along the model MDL to produce new deflections $\epsilon_x$, $\epsilon_y$, $\epsilon_y$. The tracer control unit 100 executes known tracer computations based on these deflections to generate the feed velocities $V_x$, $V_z$. The X- and Z-axis motors XM, ZM are driven by the feed velocities Vx, Vz through the speed control circuits SCCX, SCCZ, thereby moving the cutter head CT relative to the workpiece WK to machine the workpiece. Thus, tracer processing is executed in successive fashion based on the deflection of the tracer head TC to calculate the velocity commands $V_x$, $V_z$, and the motors for the respective axes are driven to transport the cutter head CT relative to the workpiece WK, whereby the workpiece WK is machined into a shape identical with that of the model MDL.

As tracer machining progresses and the present position of the machine arrives at the tracing machining inhibit area, that is, when the condition $X_a = XL_1$ is established, the X-axis present position monitoring circuit XAMC produces the control signal $GX_1$. In response to generation of the control signal GX1, the analog gate circuit SWCX sends the input to the speed control circuit SCCX to a value of zero to immediately halt movement of the table, and the analog gate circuit SWCZ supplies the speed control circuit SCCZ with the velocity command $V_{zc}$, produced by the Z-axis velocity command circuit FPGZ, in place of $V_z$. Further, when the control signal $GX_1$ is generated, the arithmetic unit ICC of the Z-axis velocity command circuit FPGZ calculates the difference $\Delta Z$ between the Z-axis position $ZL_s$ of the safe level and the present position $Z_a$ along the Z axis by performing the following operation:

$$ZL_s - Z_a \rightarrow \Delta Z \qquad (1)$$

The pulse interpolator PGC performs a pulse interpolation operation based on $\Delta Z$ to generate $\Delta Z$-number of interpolated pulses. The acceleration/deceleration circuit ADC accelerates or decelerates the interpolated pulses, and the reversible counter ERC calculates the difference between the number of pulses produced by the acceleration/deceleration circuit and the number of feedback pulses $P_z$ generated by the pulse generator PGZ. The DA converter DAC produces the velocity command $V_{zc}$, namely an analog voltage, which is proportional to the above-mentioned difference. As a result, the column CLM is elevated by an amount corresponding to $\Delta Z$ and arrives at the safe level. It should be noted that the Z-axis velocity command circuit FPGZ, speed control circuit SCCZ, motor ZM, tachometer TCMZ and pulse generator PGZ construct a well-known positioning servo system.

When the safe level is reached, the Z-axis present position monitoring circuit ZAMC generates the control signal GZ.

When the control signal GZ is produced, the analog gate circut SWCZ severs the connection between the speed control circuit SCCZ and Z-axis velocity command circuit FPGZ, and between the speed control circuit SCCZ and tracer control unit 100, and the analog gate circuit SWCX delivers the output signal of the X-axis velocity command circuit FPGX to the speed control circuit SCCX. Meanwhile, in response to generation of the control signal GZ, the arithmetic unit ICC of the X-axis velocity command circuit FPGX obtains the difference between the boundary value $XL_2$ and the present position $X_a$ along the X axis for travel in the positive (+X) direction (MDX="1"), or the difference between the boundary value $XL_1$ and the present position $X_a$ along the X axis for travel in the negative (−X) direction (MDX="0"), by performing the following operation (2) or (3), respectively:

$$XL_2 - X_a \rightarrow \Delta X \qquad (2)$$

$$XL_1 - X_a \rightarrow \Delta X \qquad (3)$$

The pulse interpolator PGC perform a pulse interpolation on the basis of $\Delta X$ to generate $\Delta X$-number of pulses. The acceleration/deceleration circuit ADC accelerates or decelerates the interpolated pulses, and the reversible counter ERC calculates the difference between the number of pulses produced by the acceleration/deceleration circuit ADC and the number of feedback pulses $P_x$ generated by the pulse generator PGX. The DA converter DAC produces the velocity command $V_{xc}$, namely an analog voltage, which is proportional to the above-mentioned difference. As a result, the table TBL is moved along the safe level by an amount corresponding to $\Delta X$ and arrives at the position $XL_2$ to move beyond the tracer machining inhibit area. It should be noted that the X-axis velocity command circuit FPGX, speed control circuit SCCX, motor XM, tachometer TCMX and pulse generator PGX construct a well-known positioning servo system.

When the present position $X_a$ of the machine becomes equivalent to $XL_2$ (for tracing in the +X direction), the X-axis present position monitoring circuit ZAMC produces the control signal $GX_2$. In response to generation of the control signal GX2, the analog gate circuit SWCX severs the connection between the speed control circuit SCCX and X-axis velocity command circuit FPCX, and between the speed control circuit SCCX and tracer control unit 100, and the analog gate circuit SWCZ connects the tracer control unit 100 to the speed control circuit SCCZ.

When the control signal $GX_2$ is generated, the tracer control apparatus 100 executes approach processing and produces the velocity commands $V_z$ based on such processing. The velocity command $V_z$ is applied to the speed control circuit SCCZ through the analog gate circuit SWCZ to lower the column CLM at a predetermined speed along the −Z axis, thereby causing the stylus STL to approach the model MDL. When the stylus STL contacts the model MDL and the resultant deflection $\epsilon$ surpasses the predetermined deflection $\epsilon_a$, the tracer control unit 100 produces the approach end signal APDEN. In response to generation of the approach end signal APDEN, the analog gate circuits SWCX, SWCZ connect the tracer control unit 100 to the speed control circuits SCCX, SCCZ, respectively, and the tracer control unit 100 executes ordinary tracer processing.

It should be noted that while the foregoing case relates to tracing along the +X direction, operation would be performed similarly for tracing along the −X direction.

According to the present invention as described above, a portion of a model is skipped automatically and tracer machining is performed on both sides of the skipped portion, or on only one side thereof. Thus it becomes possible to tracer machine one portion and NC machine the remainder. As a result, a portion for which it is difficult to create an NC tape owing to the complicated shape thereof can be tracer machined, while a portion which is not capable of being tracer machined with great accuracy and at high speed due to the sharp gradient thereof can be NC machined, thereby shortening machining time and raising machining precision.

The present invention is advantageous in that it may be applied to the fabrication of an article such as a propeller, a part of which is preferably machined by tracer machining and the remainder thereof by NC machining in view of machining time and precision.

We claim:

1. A tracer control method for calculating velocity commands along respective axes by using a deflection value sensed by a tracer head, driving motors, which are provided for the respective axes, in response to said velocity commands to move a tool relative to a workpiece, and causing the tracer head to trace a model, said method comprising the steps of:
   (a) presetting a tracer machining inhibit area and a safe level;
   (b) monitoring a machine position to sense whether the machine position has reached the machining inhibit area;
   (c) inhibiting tracer machining when the machining inhibit area is reached;
   (d) retracting the machine until the machine position coincides with said safe level;
   (e) causing the machine to pass the machining inhibit area by moving the machine position along said safe level;
   (f) causing the machine to approach a workpiece after the machining inhibit area is passed; and
   (g) executing tracer machining upon completion of the approach.

2. A tracer control method for calculating velocity commands along respective axes by using a deflection value sensed by a tracer head, driving motors, which are provided for the respective axes, in response to said velocity commands to move a tool relative to a workpiece, and causing the tracer head to trace a model, said method comprising the steps of:
   (a) presetting a tracer machining inhibit area and a safe level;
   (b) monitoring a machine position to sense whether the machine position has reached the machining inhibit area;
   (c) inhibiting tracer machining when the machining inhibit area is reached;
   (d) retracting the machine until the machine position coincides with said safe level;
   (e) causing the machine to pass the machining inhibit area by moving the machine position along said safe level;
   (f) causing the machine to approach the workpiece after the machining inhibit area is passed; and
   (g) executing tracer machining upon completion of the approach, said tracer machining being performed by scan tracing.

3. A tracer control method for calculating velocity commands along respective axes by using a deflection value sensed by a tracer head, driving motors, which are provided for the respective axes, in response to said velocity commands to move a tool relative to a workpiece, and causing the tracer head to trace a model, said method comprising the steps of:
   (a) presetting a tracer machining inhibit area and a safe level, the machining inhibit area lying in a feed direction and the safe level lying in a tracing direction;
   (b) monitoring a machine position to sense whether the machine position has reached the machining inhibit area;
   (c) inhibiting tracer machining when the machining inhibit area is reached;
   (d) retracting the machine until the machine position coincides with said safe level;
   (e) causing the machine to pass the machining inhibit area by moving the machine position along said safe level;
   (f) causing the machine to approach the workpiece after the machining inhibit area is passed; and
   (g) executing tracer machining upon completion of the approach.

4. A tracer control method for calculating velocity commands along respective axes by using a deflection value sensed by a tracer head, driving motors, which are provided for the respective axes, in response to said velocity commands to move a tool relative to a workpiece, and causing the tracer head to trace a model, said method comprising the steps of:
   (a) presetting a tracer machining inhibit area and a safe level, said machining inhibit area being specified by two coordinate values $XL_1$, $XL_2$ in the feed direction, and the safe level being specified by a coordinate value $ZL_s$ in the tracing direction;
   (b) monitoring a machine position to sense whether the machine position has reached the machining inhibit area;
   (c) inhibiting tracer machining when the machining inhibit area is reached;
   (d) retracting the machine until the machine position coincides with said safe level;
   (e) causing the machine to pass the machining inhibit area by moving the machine position along said safe level;
   (f) causing the machine to approach the workpiece after the machining inhibit area is passed; and
   (g) executing tracer machining upon completion of the approach.

5. A tracer control method according to claim 4,
   wherein during two-way scan tracing while tracing along one path step (b) comprises deciding that the machining inhibit area has been reached when a present position $X_a$ of the machine in the feed direction coincides with $XL_1$, and step (f) comprises deciding that the machining inhibit area has been passed when the present position $X_a$ coincides with $XL_2$; and
   wherein while tracing along a return path step (b) comprises deciding that the machining inhibit area has been reached when the present position $X_a$ coincides with $XL_2$, and step (f) comprises deciding that the machining inhibit area has been passed when the present position $X_a$ coincides with $XL_1$.

6. A tracer control method according to claim 4, wherein step (d) comprises generating a number of pulses equivalent to a difference between a present position $Z_a$ of the machine in the tracing direction and a safe level $ZL_s$ when the machining inhibit area is reached, and moving the machine to the safe level responsive to said pulses.

7. A tracer control method according to claim 6, wherein step (e) comprises generating a number of pulses equivalent to an interval of the machining inhibit area after the safe level is reached, and causing the machine to pass the machining inhibit area responsive to said pulses.

8. A tracer control method according to claim 7, wherein when a resultant deflection value surpasses a predetermined value at the time of an approach, it is determined that the approach is complete.

9. A method of inhibiting tracer machining of a workpiece with a machine tool when an inhibit begin limit is reached while tracing a model, said method comprising the steps of:
- (a) performing tracer machining of the workpiece in dependence upon the shape of the model until the inhibit begin limit is reached;
- (b) stopping tracer machining when the inhibit begin limit is reached;
- (c) moving the machine tool to a safe level when the inhibit begin limit is reached; and
- (d) moving the machine tool along the safe level after the inhibit begin limit is reached.

10. A method according to claim 9, further including an inhibit end limit and said method further comprising the steps of:
- (e) stopping movement of the machine tool along the safe level when the inhibit end limit is reached;
- (f) approaching the workpiece with the machine tool when the inhibit end limit is reached; and
- (g) performing tracer machining of the workpiece in dependence upon the shape of the model when the approach is step (f) is completed.

* * * * *

UNITED STATES PATENT AND TRADEMARK OFFICE
CERTIFICATE OF CORRECTION

PATENT NO. : 4,575,665
DATED : MARCH 11, 1986
INVENTOR(S) : HITOSHI MATSUURA ET AL.

It is certified that error appears in the above-identified patent and that said Letters Patent is hereby corrected as shown below:

```
FRONT PAGE [54]  "TRACER CONTROL METHOD" should be
                 --TRACER CONTROL METHOD INCLUDING A TRACER
                   MACHINING INHIBIT AREA--.

Col. 1, line 1,  "TRACER CONTROL METHOD" should be
                 --TRACER CONTROL METHOD INCLUDING A TRACER
                   MACHINING INHIBIT AREA--.

Col. 2, line 16, "(A)" should be --1(A)--;
        line 16, "(B)" should be --1(B)--;
        line 46, "opeations" should be --operations--.

Col. 3, line 42, "countr" should be --counter--;
        line 68, "generated" should be --generates--.

Col. 4, line 33, "an" should be --a--.

Col. 6, line 1,  "perform" should be --performs--;
        line 33, "commands" should be --command--.

Col. 10, line 10, "is" (first occurrence) should be --in--.
```

Signed and Sealed this

First Day of July 1986

[SEAL]

Attest:

DONALD J. QUIGG

Attesting Officer     Commissioner of Patents and Trademarks